United States Patent [19]

Tanaka et al.

[11] Patent Number: 4,511,704

[45] Date of Patent: Apr. 16, 1985

[54] PROCESS FOR PRODUCING POLYOLEFIN

[75] Inventors: Toru Tanaka, Yamato; Nobuaki Gohko, Kurashiki; Osamu Kishiro, Atsugi; Atsushi Murakami, Kawasaki, all of Japan

[73] Assignee: Mitsubishi Chemical Industries Ltd., Tokyo, Japan

[21] Appl. No.: 537,165

[22] Filed: Sep. 30, 1983

Related U.S. Application Data

[63] Continuation of Ser. No. 337,508, Jan. 6, 1982, abandoned.

[30] Foreign Application Priority Data

Jun. 25, 1981 [JP] Japan ..................... 56-98639

[51] Int. Cl.$^3$ .............................................. C08F 4/10
[52] U.S. Cl. ..................................... 526/125; 526/124
[58] Field of Search .................. 526/124, 125; 525/247

[56] References Cited

U.S. PATENT DOCUMENTS

| | | | |
|---|---|---|---|
| 3,705,886 | 12/1972 | Kashiwa | 526/124 |
| 3,900,454 | 8/1975 | Sato | 526/124 |
| 4,088,812 | 5/1978 | Matuura | 526/124 |
| 4,128,607 | 12/1978 | Shiomura | 526/124 |
| 4,130,699 | 12/1978 | Hoff | 526/124 |
| 4,223,117 | 9/1980 | Sano | 526/124 |
| 4,233,182 | 11/1980 | Hoff | 526/124 |
| 4,293,673 | 10/1981 | Hamer | 526/124 |
| 4,322,514 | 3/1982 | Miyoshi | 526/124 |
| 4,324,875 | 4/1982 | Harada | 526/124 |

FOREIGN PATENT DOCUMENTS 22304  3/1981  Japan .

Primary Examiner—Paul R. Michl
Attorney, Agent, or Firm—Oblon, Fisher, Spivak, McClelland & Maier

[57] ABSTRACT

A polyolefin is producing by polymerizing ethylene or copolymerizing ethylene and the other α-olefin at 50° to 100° C. in a hydrocarbon solvent in the presence of a catalyst system of an organoaluminum compound and a transition metal compound component which is a solid catalytic component containing a magnesium compound and a titanium compound under the condition (a) two step polymerizations of a first polymerization step and a second polymerization step in the presence of a reaction mixture obtained by said first polymerization step; (b) a polymerization in the presence of hydrogen at a molar ratio of $H_2$ to $C_2H_4$ (vapor phase) of 0.01-0.8 to produce a polymer A having a viscosity average molecular weight of $2 \times 10^5 - 7 \times 10^5$ at a ratio of 30 to 70 wt. % based on the total polymer in one of said first or second polymerization step and a polymerization in the presence of hydrogen at a molar ratio of $H_2$ to $C_2H_4$ (vapor phase) of 1.5-15 to produce a polymer B having a viscosity average molecular weight of $1 \times 10^4 - 4 \times 10^4$ at a ratio of 70 to 30 wt. % based on the total polymer in the other polymerization step to give a ratio of a viscosity average molecular weight of polymer A to a viscosity average molecular weight of polymer B of 15 to 55; (c) said production of said polymer A as a copolymer of ethylene and other α-olefin and said production of said polymer B as a homopolymer of ethylene or a copolymer of ethylene and the other α-olefin; and (d) said production of the total polymer as a polymer having a melt index of less than 0.5 g/10 min.

2 Claims, No Drawings

PROCESS FOR PRODUCING POLYOLEFIN

This application is a continuation of application Ser. No. 337,508, filed Jan. 6, 1982, abandoned.

BACKGROUND OF THE INVENTION

1. Field of the Invention

The present invention relates to a process for producing a polyolefin. More particularly, it relates to a process for producing a polyolefin by two step polymerization under a specific condition in the presence of a specific catalyst and a cocatalyst to impart excellent extruding property, excellent stability in an inflation process of a tubular product, excellent texture, impact strength and environmental stress crack resistance of a film and excellent strength of an inflation molded film and less formation of fisheye.

2. Description of the Prior Art

In general, polyethylene is molded into a film by an inflation process or T-die process etc. Recently, the speed for molding has been fastened because of an improvement of a molding machine and an improvement of productivity. When the speed for molding is fastened especially in an inflation process, the molten polymer extruded becomes unstable not to produce a tubular product in stable and an uniform film is not easily obtained and an appearance of the film is sometimes inferior.

In order to obtain a tubular product in stable, it has been considered to incorporate a radical initiator. When a content of the radical initiator is too much, the strength of the film is inferior to cause a gel or spots and the range for the balance of the stability of the tubular product and the strength of the film are narrow.

The inventors have studied processes for producing a polyolefin which has excellent moldability especially extrusion property and stability of a tubular product in an inflation process, excellent texture of a film and has excellent impact strength and environmental stress crack resistance, high strength of an inflation molded film and less fisheye.

SUMMARY OF THE INVENTION

It is an object of the present invention to provide a process for producing a polyolefin having excellent moldability and physical properties and less fisheye by selecting a ratio of polymers, molecular weights and copolymerization degree and selecting a transition metal compound as a main catalyst and an organoaluminum compound as a cocatalyst.

Another object of the present invention is to provide a process for producing a polyolefin which has excellent moldability especially extrusion property and stability of a tubular product in an inflation process, excellent texture of a film and has excellent impact strength and environmental stress crack resistance, high strength of an inflation molded film and less fisheye.

The foregoing and other objects of the present invention have been attained by providing a process for producing a polyolefin which comprises polymerizing ethylene or copolymerizing ethylene and the other α-olefin at 50° to 100° C. in a hydrocarbon solvent in the presence of a catalyst system of an organoaluminum compound and a transition metal compound component which is a solid catalytic component containing a magnesium compound and a titanium compound under the condition (A) two step polymerizations of a first polymerization step and a second polymerization step in the presence of a reaction mixture obtained by said first polymerization step; (B) a polymerization in the presence of hydrogen at a molar ratio of $H_2$ to $C_2H_4$ (vapor phase) of 0.01–0.8 to produce a polymer A having a viscosity average molecular weight of $2 \times 10^5 - 7 \times 10^5$ at a ratio of 30 to 70 wt.% based on the total polymer in one of said first or second polymerization step and a polymerization in the presence of hydrogen at a molar ratio of $H_2$ to $C_2H_4$ (vapor phase) of 1.5–15 to produce a polymer B having a viscosity average molecular weight of $1 \times 10^4 - 4 \times 10^4$ at a ratio of 70 to 30 wt.% based on the total polymer in the other polymerization step to give a ratio of a viscosity average molecular weight of polymer A to a viscosity average molecular weight of polymer B of 15 to 55; (C) said production of said polymer A as a copolymer of ethylene and other α-olefin and said production of said polymer B as a homopolymer of ethylene or a copolymer of ethylene and the other α-olefin; and (D) said production of the total polymer as a polymer having a melt index of less than 0.5 g/10 min. The present invention also provides a process for producing a polyolefin which comprises polymerizing ethylene or copolymerizing ethylene and the other α-olefin in the presence of a catalyst system of an organoaluminum compound and a transition metal compound component as a reaction product obtained by reacting an oxygen-containing organomagnesium compound with a titanium halide compound or a reaction product obtained by reacting an oxygen-containing organomagnesium compound, an oxygen-containing organotitanium compound with an aluminum halide compound wherein said organoaluminum compound is alkylaluminum chloride or a mixture of a trialkylaluminum and an alkylaluminum chloride.

DETAILED DESCRIPTION OF THE PREFERRED EMBODIMENTS

The catalyst system used in the process of the present invention comprises a solid catalytic component containing a magnesium compound and a titanium compound and a cocatalyst of an organoaluminum compound. The polymer having excellent moldability (extrusion property and stability of a tubular product), excellent impact strength and environmental stress crack resistance and high strength of film and less fisheye can be obtained by using the catalyst system under the following condition. This is superior to the polyolefin produced by using the other catalyst system such as a catalyst system containing the same solid catalytic component and trialkylaluminum as an organoaluminum compound.

The typical solid catalytic components containing the magnesium compound and the titanium compound can be exemplified in (a) to (e):

(a) a reaction product obtained by reacting an oxygen-containing organomagnesium compound and an oxygen-containing organotitanium compound with an aluminum halide compound;

(b) a reaction product obtained by reacting an oxygen-containing organomagnesium compound and an oxygen-containing organotitanium compound with a silicon halide compound;

(c) a reaction product obtained by reacting an oxygen-containing organomagnesium compound with a titanium halide compound;

(d) a reaction product obtained by reacting magnesium dihalide, an oxygen-containing organomagnesium compound, an oxygen-containing organotitanium compound with an aluminum halide compound; and (e) a reaction product obtained by reacting a titanium compound with a solid obtained by treating a magnesium-containing solid with an oxygen-containing organoboron compound.

The production of the catalytic components (a) to (e) will be illustrated in detail.

Preparation of catalytic component (a)

The oxygen-containing organomagnesium compound used for the preparation of the reaction product (a) is represented by the formula:

$$Mg(OR^1)_m X^1_{2-m}$$

wherein $R^1$ represents an alkyl, aryl or cycloalkyl group; $X^1$ represents a halogen atom and m is 1 or 2. Suitable compounds include magnesium diethoxide, magnesium dimethoxide, magnesium diphenoxide, magnesium monoethoxychloride, magnesium monophenoxychloride, magnesium monoethoxybromide and magnesium monoethoxyiodide. It is optimum to use magnesium ethoxide.

The oxygen-containing organotitanium compound is represented by the formula:

$$ti(OR^2)_n X^2_{4-n}$$

wherein $X^2$ represents a halogen atom; $R^2$ represents an alkyl, aryl or cycloalkyl group; and n is selected in a range of 1 to 4. Suitable compounds include titanium tetraethoxide, titanium tetra-n-butoxide, titanium diethoxydichloride, titanium di-n-butoxydichloride, titanium triethoxymonochloride, titanium tri-n-butoxymonochloride, titanium ethoxytrichloride, titanium n-butoxytrichloride and titanium methoxytribromide. It is optimum to use titanium tri-n-butoxymonochloride.

The aluminum halide compound is represented by the formula:

$$AlR^3_p X^3_{3-p}$$

wherein $R^3$ represents an alkyl, aryl or cycloalkyl group; $X^3$ represents a halogen atom; and p is $0<p<3$. Suitable compounds include ethylaluminum dichloride, ethylaluminum sesquichloride, diethylaluminum monochloride and n-propylaluminum dichloride. It is optimum to use ethylaluminum sesquichloride.

In the reaction of the component, the oxygen-containing organomagnesium compound and the oxygen-containing organotitanium compound are mixed and the mixture is heated at 100° C. to 160° C. to prepare a uniform liquid. If a uniform liquid is not formed, it is preferable to add an alcohol such as ethanol, n-butanol and n-octanol. An inert hydrocarbon solvent is added to the uniform liquid to prepare an inert hydrocarbon solution.

The aluminum halide compound is added to the resulting inert hydrocarbon solution to react them at an ambient temperature to 100° C. The reaction product is obtained as precipitate and the unreacted components are removed by washing with an inert hydrocarbon solvent.

The ratios of the components are preferably as follows: A molar ratio of the the titanium compound to the magnesium compound (Ti/Mg) is in a range of 0.1 to 10. A molar ratio of the aluminum halide compound to the sum of moles of the magnesium compound and moles of the titanium compound (Al compound)/(Mg compound+Ti compound) is in a range of 1 to 20.

Preparation of catalytic component (b)

The oxygen-containing organomagnesium compound and the oxygen-containing organotitanium compound used in the preparation of the reaction product (b) can be the compounds used in the preparation of the reaction product (a).

The silicon halide compound is represented by the formula:

$$R^4_q SiX^4_{4-q}$$

wherein $R^4$ represents an alkyl, aryl or cycloalkyl group; $X^4$ represents a halogen atom; and q is $0 \leq q \leq 2$. It is preferable to use the compound having chlorine atom as $X^4$. Suitable compounds include silicon tetrachloride, methyl trichlorosilane, ethyl trichlorosilane, phenyl trichlorosilane and diethyl dichlorosilane. It is optimum to use a silicon chloride compound having q=0 such as silicon tetrachloride.

In the reaction of the components, the reaction of the oxygen-containing organomagnesium compound with the oxygen-containing organotitanium compound is performed as the reaction in the preparation of the catalytic component (a). The silicon halide compound is added to the resulting inert hydrocarbon solution to react them at an ambient temperature to 100° C. The reaction product is obtained as precipitate and the unreacted components are removed by washing with an inert hydrocarbon solvent.

The ratios of the components are preferably as follows: A molar ratio of the titanium compound to the magnesium compound (Ti/Mg) is in a range of 0.1 to 10. A molar ratio of the silicon halide compound to the sum of moles of the magnesium compound and moles of the titanium compound (Si compound)/(Mg compound+Ti compound) is in a range of 1 to 20.

Preparation of catalytic component (c)

The oxygen-containing organomagnesium compound and the oxygen-containing organotitanium compound used in the preparation of the reaction product (c) can be the compounds used in the preparation of the reaction product (a).

The titanium halide compound is represented by the formula $$TiX^5_r(OR^5)_{4-r}$$

wherein $X^5$ represents a halogen atom, $R^5$ represents an alkyl, aryl or cycloalkyl group and r is selected in a range of 1 to 4. Suitable compounds include titanium tetrahalides such as titanium tetrachloride, titanium tetrabromide and titanium tetraiodide, and titanium monoethoxytrichloride, titanium monomethoxytribromide and titanium diethoxydichloride. It is optimum to use titanium tetrahalides.

In the reaction of the components, the reaction of the oxygen-containing organomagnesium compound with the titanium halide compound is performed by contacting them in the presence or absence of an inert hydrocarbon solvent at 50° C. to 200° C. The reaction product is obtained as precipitate and the unreacted components are removed by washing with an inert hydrocarbon solvent.

A ratio as an atomic ratio of Ti to Mg is not critical. When it is too high, the titanium component is wasted whereas when it is too small, the polymerization activity is inferior. The molar ratio of Ti/Mg is usually in a range of 0.1 to 100.

Preparation of catalytic component (d)

The magnesium dihalide compound used for the preparation of the reaction product (d) is represented by the formula $$MgX_2^6$$

wherein $X^6$ represents a halogen atom. Suitable compounds include magnesium chloride, magnesium bromide and magnesium iodide. It is optimum to use magnesium chloride.

The other components can be the same as the compounds used in the preparation (a).

In the preparation of the reaction product (d) the oxygen-containing organomagnesium compound and the oxygen-containing organotitanium compound are mixed and the mixture is heated at 100° C. to 160° C. to prepare a uniform liquid. When a uniform liquid is not formed, it is preferable to add an alcohol. Then, a hydrocarbon solvent is added to prepare a hydrocarbon solution. The magnesium dihalide compound is added to the hydrocarbon solution to form a suspension and then the aluminum halide compound is added to react them at an ambient temperature to 100° C. The reaction product is obtained as a precipitate. The unreacted product is removed by washing with an inert solvent.

The ratios of the components are preferably as follows: A molar ratio of the titanium compound to the oxygen-containing organomagnesium compound is in a range of 0.1 to 10. A molar ratio of the aluminum halide compound to the sum of moles of the oxygen-containing organomagnesium compound and moles of the titanium compound a (Al compound)/(Mg compound+Ti compound) is in a range of 1 to 20.

Preparation of catalytic component (e)

The magnesium-containing solid used in the preparation of the reaction product (e) can be any solids made of magnesium and the other element and can be a compound, a mixture, and eutectic crystal. However, the effect of the present invention is not satisfactorily attained by using metallic magnesium or alloy thereof. Suitable magnesium-containing solids include magnesium halides such as magnesium fluoride, magnesium chloride, magnesium bromide, magnesium iodode; magnesium hydroxide, magnesium carbonate, magnesium hydroxychloride, magnesium oxide, and organic salts of magnesium such as magnesium oxalate and magnesium acetate; magnesium alcoholates such as magnesium methylate, magnesium ethylate and magnesium phenolate; magnesium haloalcoholate such as magnesium monochloromonoethoxide; complex oxides or alcoholates of magnesium and other metal such as calcium; magnesium-containing minerals such as hydrotalcite, montmorillonite and sepiolite. The optimum magnesium-containing solids are magnesium halides, magnesium hydroxychloride, magnesium alcoholates and magnesium haloalcoholates.

The boron compound used in the preparation is represented by the formula $$B(OR^7)_n X_{3-n}^7$$

wherein $R^7$ represents a $C_1$-$C_{14}$ hydrocarbon moiety; $X^7$ represents a halogen atom; and n is selected in a range of 1—4.

The hydrocarbon moiety as $R^7$ can be alkyl, aryl and aralkyl group and can be the same or different in the case of plurality of $R^7$. The halogen atom as $X^7$ can be Cl, Br and I and is preferably Cl. Suitable boron compounds having the formula include boron trialkoxides such as $B(OCH_3)_3$, $B(OC_2H_5)_3$, $B(OC_3H_7)_3$, $B(O\text{-iso-}C_3H_7)_3$, $B(O\text{-n-}C_4H_9)_3$, $B(O\text{-iso-}C_4H_9)_3$, $B(OC_6H_5)_3$, $B(OC_6H_4CH_3)_3$ and $B(OCH_2C_6H_5)_3$ and boron haloalkoxides such as $B(O\text{-iso-}C_3H_7)_2Cl$, $B(OCH_3)(OC_6H_5)Cl$ and $B(O\text{-iso-}C_3H_7)Cl_2$.

The process for treating the magnesium-containing solid with the boron compound is not critical. After thoroughly contacting them, if necessary, excess of the boron compound is removed.

A ratio of the boron compound to the magnesium-containing solid in the treatment is not critical. When the amount of the boron compound is too small, the effect is not remarkable. The boron compound is preferably used at a molar ratio of 0.001 or more based on magnesium of the magnesium-containing solid in order to prepare a catalyst having high activity.

The temperature for treatment is selected from the range of 20° to 400° C. preferably 50° to 300° C. The time required for treatment can be controlled depending upon the temperature for treatment and is usually 5 min. or longer preferably 30 min. to 10 hours. It can be longer though it is unnecessary.

The titanium compound is supported on the resulting solid. Suitable titanium compounds include titanium tetrachloride, titanium tetrabromide, titanium ethoxytetrachloride, titanium diethoxydichloride, titanium dibutoxydichloride and titanium phenoxytrichloride.

The process for supporting the titanium compound on the solid can be the known supporting process. It is preferable to contact them in the absence of a solvent at 50° to 300° C. especially 100° to 150° C. The time required for treatment is in a range of 5 min. to 10 hours. It can be longer though it is unnecessary.

The special feature of the present invention is to use alkylaluminum chloride or a mixture of an alkylaluminum chloride and a trialkylaluminum as a cocatalyst used in combination of the solid catalytic component. Thus, a polymer having excellent moldability (an extrusion property and a stability of a tubular product) and excellent impact strength and environmental crack resistance and film strength and having less fisheye can be obtained by producing a polyolefin under the below-mentioned condition. In the present invention, an atomic ratio of Cl to Al (Cl/Al) is preferably in a range of 0.1 to 1.5 preferably 0.5 to 1.

The alkylaluminum chlorides can be dialkylaluminum chlorides, alkylaluminum sesquichlorides and alkylaluminum dichlorides. Suitable dialkylaluminum chlorides include diethylaluminum chloride, diisobutylaluminum chloride and ethylmethylaluminum chloride. Suitable alkylaluminum sesquichlorides include ethylaluminum sesquichloride, isobutylaluminum sesquichloride and isopropylaluminum sesquichloride. Suitable alkylaluminum dichlorides include ethylaluminum dichloride, and isobutylaluminum dichloride. On the other hand, trialkylaluminums include triethylaluminum, triisobutylaluminum, triisoprenylaluminum and ethyldiisopropylaluminum. The alkyl groups of the organoaluminum compounds as the cocatalyst are usually $C_{1-12}$ alkyl groups.

The trialkylaluminum and the alkylaluminum chloride can be mixed before charging them into a reactor or can be mixed in a reactor.

A ratio of the organoaluminum compound as the cocatalyst in the form of the mixture to the solid catalytic component as an atomic ratio of Al/Ti is preferably in a range of 0.1 to 100 especially 1 to 20.

In the process of the present invention, a polymerization of ethylene or a copolymerization of ethylene and the other α-olefin is carried out in a hydrocarbon solvent with the catalyst at 50° to 100° C.

Suitable hydrocarbon solvents include aliphatic hydrocarbons such as hexane and heptane; and aromatic hydrocarbons such as benzene, toluene and xylene; and alicyclic hydrocarbons such as cyclohexane and methyl cyclohexane as inert hydrocarbon solvents.

The α-olefin as a comonomer is represented by the formula:

$$R^8-CH=CH_2$$

wherein $R^8$ represents a $C_{1-12}$ alkyl group. Suitable olefins include propylene, butene-1, hexene-1, 4-methylpentene-1 and octene-1. A content of the comonomer is usually 5 mol % or less in the polymer.

In the process of the present invention, the polymerization is carried out under the following condition (A), (B), (C) and (D):

(A) The polymerization is carried out in two step reactions wherein a reaction mixture obtained by a polymerization in the first step is mixed in the second step of a polymerization;

(B) In one of the first and second reaction steps, a polymerization is carried out in the presence of hydrogen at a molar ratio of hydrogen to ethylene in a vapor phase of 0.01 to 0.8 to produce a polymer A having a viscosity average molecular weight of $2 \times 10^5 - 7 \times 10^5$ at a ratio of 30 to 70 wt.% based on the total polymers; and in the other reaction step, a polymerization is carried out in the presence of hydrogen at a molar ratio of hydrogen to ethylene in a vapor phase of 1.5 to 15 to produce a polymer B having a viscosity average molecular weight of $1 \times 10^4 - 4 \times 10^4$ at a ratio of 70 to 30 wt.% based on the total polymers to give a ratio of the viscosity average MW of polymer A to the viscosity average MW of polymer B of 15 to 55;

(C) The polymer A is a copolymer of ethylene and the other α-olefin and the polymer B is a homopolymer of ethylene and a copolymer of ethylene and the other α-olefin;

(D) The melt index of the total polymers is less than 0.5 g./10 min.

The conditions (A), (B), (C) and (D) will be further illustrated. The two step polymerization can be carried out in a continuous polymerization or a batch polymerization. In the case of the continuous polymerization, two reactors are connected in series. The reaction mixture obtained in the first reactor is fed into the second reactor to continue the polymerization. If necessary, a flash vessel for purging most of hydrogen is placed between the two reactors. In the batch polymerization, the polymerization are sequentially carried out in one reactor. It is preferable to employ the continuous polymerization process.

Under the condition (B), in one of the first and second steps, the polymerization is carried out in the presence of hydrogen at a molar ratio of hydrogen to ethylene in a vapor phase of 0.01 to 0.8 to produce the polymer having a viscosity average molecular weight of $2 \times 10^5$ or $7 \times 10^5$ at a ratio of 30 to 70 wt.% based on the total polymers. The viscosity average molecular weight is calculated from an intrinsic viscosity measured at 130° C. in tetrahydronaphthalene by the equation:

$$[\eta] = 4.60 \times 10^{-4} \times M^{0.725}$$

wherein $[\eta]$ represents an intrinsic viscosity and M represents a viscosity average molecular weight.

When the polymer A is produced in the second step in the presence of the polymer B obtained in the first step, the polymer A has a viscosity average molecular weight given by the equation:

$$[\eta]_A = (100[\eta] - W_B[\eta]_B)/W_A$$

wherein $[\eta]_A$ represents an intrinsic viscosity of the polymer A; $[\eta]_B$ represents an intrinsic viscosity of the polymer B and $[\eta]$ represents an intrinsic viscosity of the total polymer obtained in the second step; $W_A$ represents an amount (wt.%) of the polymer A produced in the second step; and $W_B$ represents an amount (wt.%) of the polymer B produced in the first step. Therefore, the viscosity average molecular weight can be calculated from $[\eta]_A$.

When the viscosity average molecular weight is less than $2 \times 10^5$, the resulting polymer (the total polymers) has inferior impact strength, tear strength and low environmental stress cracking resistance whereas when it is more than $7 \times 10^5$, the polymer has inferior processability. The molecular weight is preferably in a range of $2.3 \times 10^5 - 6 \times 10^5$ especially $3 \times 10^5 - 6 \times 10^5$.

When a molar ratio of hydrogen to ethylene in a vapor phase is less than 0.01, the viscosity average molecular weight may be more than $7 \times 10^5$ whereas it is more than 0.5, the viscosity average molecular weight may be less than $2 \times 10^5$. When the ratio of the production of the polymer A is less than 30 wt.%, the resulting total polymers have inferior impact strength and tear strength and low environmental stress cracking resistance whereas when it is more than 70 wt.%, the processability is inferior.

The ratio of the polymer A is preferably in a range of 30 to 60 wt.% especially 35 to 55 wt.%.

The polymerization can be carried out at 50° to 100° C. for 10 min. to 10 hours under a pressure of 0.5 to 100 kg/cm² (gauge).

The polymer A is a copolymer having a comonomer component at a content of 0.1 to 4 mole % preferably 0.5 to 3 mole %. In view of the processability and the impact strength.

In the other reaction step, the polymer B having a viscosity average molecular weight of $1 \times 10^4 - 4 \times 10^4$ is produced at a ratio of 70 to 30 wt.% based on the total polymers by polymerizing in the presence of hydrogen at a molar ratio of hydrogen to ethylene in vapor phase. The viscosity average molecular weight can be calculated by the aforementioned equation by measuring an intrinsic viscosity at 130° C. in tetrahydronaphthalene.

When the polymer B is produced in the second step in the presence of the polymer A obtained in the first step, the viscosity average molecular weight of the polumer B is given by the equation:

$$[\eta]_B = (100[\eta] - W_A'[\eta]_A/W_B'$$

wherein $[\eta]_B$ represents an intrinsic viscosity of the polymer B; $[\eta]_A$ represents an intrinsic viscosity of the total polymers obtained in the second step; $W_A'$ represents an amount (wt.%) of the polymer A obtained in the first step and $W_B'$ represents an amount (wt.%) of the polymer B obtained in the second step. The viscosity average molecular weight can be calculated from $[\eta]_B$.

When the viscosity average molecular weight is less than $1\times10^4$, the total polymers have inferior impact strength whereas when it is more than $4\times10^4$, the processability is inferior.

When a molar ratio of hydrogen to ethylene in vapor phase is less than 1.5, the viscosity average molecular weight of the polymer B may be more than $4\times10^4$ whereas when it is more than 15, the viscosity average molecular weight may be less than $1\times10^4$. The viscosity average molecular weight of the polymer B is preferable in a range of $1\times10^4$ to $3.5\times10^4$. When a ratio of the polymer B is more than 70 wt.%, the total polymers have inferior impact strength and tear strength and low environmental stress cracking resistance whereas when it is less than 30 wt.%, the processability is inferior. The ratio of the polymer B is preferably in the range of 70 to 40 wt.% especially 65 to 45 wt.%.

The polymerization is carried out at 50° C. to 100° C. for 10 min. to 10 hours under a pressure of 0.5 to 100 kg./cm² (gauge). The polymer B is preferably homopolymer of ethylene and can be a copolymer having a comonomer component at a content of 2 mole % or less preferably 1 mole % or less. The content of the comonomer component is preferably small in view of rigidity.

The order of the polymerizations can be the order of the production of the polymer A followed by the production of the polymer B or the order of the production of the polymer B followed by the production of the polymer A.

A ratio of the viscosity average molecular weight of the polymer A to the viscosity average molecular weight of the polymer B is in a range of 15 to 55 preferably 20 to 50. When the ratio is less than 15, the processability is inferior whereas when it is more than 55, the impact strength is inferior.

Under the condition (D), the melt index of the total polymers as a mixture of the polymer A and the polymer B is less than 0.5. The melt index is measured by ASTM D-1238 at 190° C. under a load of 2.16 kg. The unit is g./10 min. When the melt index is more than 0.5, the total polymers have inferior impact strength and lower environmental stress crack resistance whereas when the melt index is in a range of 0.1 to 0.5, the total polymers have excellent processability and environmental stress crack resistance and a small Barus effect whereby the polymers have high speed processability in a blow molding or an extrusion molding to have less edge tear. When the melt index is less than 0.1, the processability is superior. Even though the melt index is less than 0.05, the processability is still good and a surging of an extruder can be prevented to be advantageous in the field of a thin film and a large size blow molding.

The resulting polymers are preferably kneaded. The polymers obtained by the process of the present invention are easily mixed in uniform, for example, by a continuous kneading by a monoaxial extruder. The polymers obtained by the kneading has an advantage of no formation of fisheye.

The present invention will be illustrated by certain examples and references which are provided for purposes of illustration only and are not intended to be limiting the invention.

In the examples, the physical properties were tested by using samples obtained by kneading each polymer powder by a dulmage-screw extruder having an inner diameter of 40 mm and L/D of 24 and pelletizing it.

The extrusion rate as a level of the processability was measured by using a monoaxial extruder (EA-40) having L/D of 26, a compression ratio of 3.5, full-fleighted-screw and a diameter of a die of 50 mm and a clearance of 1.0 manufactured by Modern Machinery Co. at a temperature of the die of 200° C. and a speed of 90 r.p.m. as an extruded amount (g) per minute.

The stability of tubular product and the fisheye were respectively measured by observing the film in an inflation molding at a blow up ratio of 4, a running speed of 20 to 50 m/min. a frost line height of 50 cm, and a thickness of the film of 10μ.

The strength of the film was tested by the Elmendorf tear strength in JIS P8116 and the Dart drop impact in ASTM D-1709.

The physical properties of polyethylene as MI(melt index) and FR (flow ratio) were measured as follows:
MI(melt index) . . . ASTM D-1238-65T
FR(flow ratio) . . . Mitsubishi Chem. Ind. method Each flow rate under a pressure of $10^6$ dyne/cm² and $10^5$ dyne/cm² was measured by a MI tester and a nozzle for MI measurement and a ratio of the flow rates was calculated by the scale of non-Newton's flow of a melted polyethylene.

ESCR (environmental stress crack resistance) was measured by ASTM D-1693-70.

Density was measured by the density gradient method of

EXAMPLES 1 TO 13

References 1 to 4

(A) A mixture of 115 g. of magnesium ethoxide, 151 g. of titanium tri-n-butoxymonochloride and 37 g. of n-butanol was mixed at 140° C. for 6 hours to be uniform. Then, the mixture was cooled to 60° C. and admixed with benzene to form a uniform solution. At each predetermined temperature, 620 g. of ethylaluminum sesquichloride was added dropwise and the mixture was stirred for 1 hour. The resulting precipitate was washed with n-hexane to obtain a catalytic component. A part of the resulting solid was dried to be a powder which contained 11.0 wt.% of Mg component and 10.5 wt.% of Ti component.

(B) A mixture of 57 g. of magnesium ethoxide and 150 g. of titanium tri-n-butoxymonochloride was mixed at 130° C. for 6 hours to be uniform. The mixture was cooled to 60° C. and admixed with benzene to form a uniform solution and then, 850 g. of silicon tetrachloride was added dropwise and the mixture was stirred for 1 hour. The resulting precipitate was washed with n-hexane to obtain a catalytic component.

(C) A reaction of 10 g. of magnesium ethoxide and 70 ml. of titanium tetrachloride was carried out at 130° C. for 2 hours and the reaction product was cooled and washed with n-hexane to obtain a catalytic component.

(D) (i) A mixture of 5.7 g. of magnesium ethoxide, 7.5 g. of titanium tributoxymonochloride and 1.8 g. of n-butanol was mixed and stirred at 140° C. for 6 hours to be uniform and then benzene was added to form a uniform solution.

(ii) A commercial anhydrous magnesium chloride was dried at 200° C. for 5 hours under a reduced pressure and 43 g. of the product was pulverized by a vibration mill for 75 hours.

(iii) The products in (i) and (ii) were mixed and 37 g. of ethylaluminum sesquichloride was added at each predetermined temperature and the mixture was stirred for 1 hour. The resulting precipitate was washed with n-hexane to obtain a catalytic component.

(E) A commercial anhydrous magnesium chloride was dried at 200° C. for 5 hours under a reduced pressure. A mixture of 10 g. of the dried product and 60 ml. of $B(O\text{-}iso\text{-}C_3H_7)_3$ was heated at 80° C. for 2 hours and then the residual boron compound was vaporized at 50° C. under a reduced pressure to obtain a solid powder. A reaction of the solid powder and 100 ml. of titanium tetrachloride was carried out at 130° C. for 2 hours. After cooling it, the reaction product was washed with n-hexane to obtain a catalytic component.

(2) Polymerization

Into a 5 liter autoclave, 3 liter of n-hexane and each slurry of each catalytic component in an amount shown in Table 1 were charged and each organoaluminum shown in TABLE 1 in each predetermined amount was charged. The autoclave was heated to each predetermined temperature and hydrogen was fed. Then, ethylene was fed to perform a polymerization at a molar ratio of $H_2/C_2H_4$ in vapor phase shown in Table 1. The amount of the polymer was calculated by the sum of the feed of ethylene.

When a desired yield was given, the feed of ethylene was stopped to finish the polymerization in the first step. The polymerization in the second step was started after purging hydrogen. In the second step, the $\alpha$-olefin was fed and ethylene was continuously fed at a molar ratio of $H_2/C_2H_4$ in vapor phase shown in Table 1 to perform the polymerization under a constant pressure at a constant temperature.

In Example 12, ethylaluminum sesquichloride was newly added in the second step.

The amount of the polymer was calculated by the amount of the feed of ethylene. The physical properties of the resulting polymers measured are shown in Table 1.

TABLE 1

| Kind and amount of catalyst [mg] | Exp. 1<br>A 30 | Exp. 2<br>A 30 | Exp. 3<br>A 30 | Exp. 4<br>A 30 | Exp. 5<br>A 30 | Exp. 6<br>A 30 | Exp. 7<br>B 60 |
|---|---|---|---|---|---|---|---|
| Co-Catalyst | | | | | | | |
| Kind | $Al(Et)_2Cl$ | $Al(Et)_2Cl$ + $Al(Et)_3$ | $AlEtCl_2$ + $Al(Et)_3$ | $Al(Et)_2Cl$ + $Al(Et)_3$ | $Al(Et)_2Cl$ + $Al(Et)_3$ | $Al(Et)_2Cl$ | $Al(Et)_2Cl$ + $Al(i\text{-}Bu)_3$ |
| Amount (m mol) | 0.5 | 0.45 + 0.05 (0.5) | 0.18 + 0.32 (0.5) | 0.25 + 0.25 (0.5) | 0.45 + 0.05 (0.5) | 0.5 | 0.7 + 0.3 (1) |
| Cl/Al | 1 | 0.9 | 0.7 | 0.5 | 0.9 | 1 | 0.7 |
| First step | | | | | | | |
| Reaction temp. (°C.) | 90 | 90 | 90 | 80 | 90 | 90 | 90 |
| Molar ratio of $H_2/C_2H_4$ in vapor phase | 9.5 | 7.0 | 8.0 | 6.5 | 5.5 | 8.5 | 4.5 |
| $\alpha$-Olefin | none | none | none | $1\text{-}C_4H_8$ | none | none | none |
| Amount of $\alpha$-olefin (wt. %) | none | none | none | 1.0 | none | none | none |
| Time (min.) | 240 | 90 | 75 | 60 | 95 | 228 | 90 |
| Amount of polyolefin B (wt. %) | 50 | 55 | 50 | 50 | 60 | 50 | 50 |
| MW of polyolefin B ($\times 10^4$) | 1.3 | 1.1 | 1.4 | 1.2 | 1.4 | 1.5 | 1.2 |
| Second step | | | | | | | |
| Reaction temp. (°C.) | 70 | 70 | 70 | 80 | 70 | 70 | 70 |
| Molar ratio of $H_2/C_2H_4$ in vapor phase | 0.25 | 0.18 | 0.12 | 0.10 | 0.15 | 0.23 | 0.15 |
| $\alpha$-Olefin | $1\text{-}C_4H_8$ | $1\text{-}C_4H_8$ | $1\text{-}C_4H_8$ | $1\text{-}C_4H_8$ | $1\text{-}C_6H_{12}$ | $C_3H_6$ + $1\text{-}C_8H_{16}$ | $1\text{-}C_4H_8$ |
| Amount of $\alpha$-olefin (wt. %) | 5.4 | 3.8 | 5.0 | 2.8 | 6.0 | 6.5 | 5.0 |
| Time (min.) | 120 | 50 | 40 | 32 | 65 | 100 | 70 |
| Amount of polyolefin A (wt. %) | 50 | 45 | 50 | 50 | 40 | 50 | 50 |
| MW of polyolefin A ($\times 10^4$) | 38 | 42 | 40 | 35 | 45 | 43 | 34 |
| Properties of polymer | | | | | | | |
| MI (g/10 min.) | 0.045 | 0.067 | 0.038 | 0.053 | 0.050 | 0.030 | 0.062 |
| FR | 95 | 94 | 87 | 85 | 102 | 76 | 61 |
| Density (g/cm$^3$) | 0.949 | 0.953 | 0.950 | 0.950 | 0.950 | 0.951 | 0.953 |
| Fisheye | none | none | none | none | none | none | none |
| Stability of tubular product | good | good | good | good | good | good | good |
| Extrusion molding rate (g) | 210 | 215 | 207 | 208 | 213 | 205 | 208 |
| Film tear strength: MD (kg/cm) | 10.5 | 11.5 | 11.0 | 12.3 | 40 | 15.3 | 12.0 |
| TD (kg/cm) | 140 | 113 | 130 | 95 | 220 | 130 | 108 |
| ESCR (hr.) | >1000 | >1000 | >1000 | >1000 | >1000 | >1000 | >1000 |
| Dart drop impact (g) | 780 | 520 | 830 | 650 | 1,200 | 950 | 550 |

| Kind and amount of catalyst [mg] | Exp. 8<br>C 60 | Exp. 9<br>C 60 | Exp. 10<br>D 90 | Exp. 11<br>E 100 | Exp. 12<br>A 45 | Exp. 13<br>A 30 |
|---|---|---|---|---|---|---|
| Co-Catalyst | | | | | | |

TABLE 1-continued

| Kind | Al$_2$Et$_3$Cl$_3$ + Al(Et)$_3$ | Al(Et)$_2$Cl | Al(Et)$_2$Cl + Al(Et)$_3$ | Al(Et)$_2$Cl + Al(Et)$_3$ | 1st step Al(Et)$_2$Cl + Al(Et)$_3$ | 2nd step Al$_2$Et$_3$Cl$_3$ | 1st step Al(Et)$_2$Cl + Al(Et)$_3$ |
|---|---|---|---|---|---|---|---|
| Amount (m mol) | 0.50 + 0.50 (1) | 1.0 | 0.75 + 0.75 (1.5) | 1.2 + 0.3 (1.5) | 0.675 + 0.075 (0.75) | (0.75) | 0.45 + 0.05 (0.50) |
| Cl/Al | 0.75 | 1 | 0.5 | 0.8 | 0.9 | 1.2 | 0.9 |
| First step | | | | | | | |
| Reaction temp. (°C.) | 90 | 80 | 80 | 90 | 90 | | 90 |
| Molar ratio of H$_2$/C$_2$H$_4$ in vapor phase | 4.8 | 6.3 | 7.5 | 10.5 | 6.5 | | 7.5 |
| α-Olefin | none | 1-C$_4$H$_8$ | 1-C$_6$H$_{12}$ | none | none | | none |
| Amount of α-olefin (wt. %) | none | 0.8 | 1.6 | none | none | | none |
| Time (min.) | 75 | 210 | 120 | 120 | 60 | | 90 |
| Amount of polyolefin B (wt. %) | 47 | 60 | 50 | 55 | 50 | | 50 |
| MW of polyolefin B (× 10$^4$) | 1.4 | 1.4 | 1.5 | 1.2 | 1.2 | | 1.1 |
| Second step | | | | | | | |
| Reaction temp. (°C.) | 70 | 75 | 80 | 70 | 70 | | 80 |
| Molar ratio of H$_2$/C$_2$H$_4$ in vapor phase | 0.08 | 0.20 | 0.17 | 0.28 | 0.22 | | 0.38 |
| α-Olefin | 1-C$_6$H$_{12}$ | 1-C$_4$H$_8$ | 1-C$_6$H$_{12}$ | 1-C$_4$H$_8$ | 1-C$_4$H$_8$ | | 1-C$_4$H$_8$ |
| Amount of α-olefin (wt. %) | 5.6 | 3.0 | 2.2 | 5.2 | 5.0 | | 1.0 |
| Time (min.) | 50 | 105 | 85 | 90 | 85 | | 60 |
| Amount of polyolefin A (wt. %) | 53 | 40 | 50 | 45 | 50 | | 50 |
| MW of polyolefin A (× 10$^4$) | 38 | 49 | 35 | 45 | 38 | | 23 |
| Properties of polymer | | | | | | | |
| MI (g/10 min.) | 0.028 | 0.043 | 0.052 | 0.024 | 0.038 | | 0.34 |
| FR | 77 | 97 | 83 | 103 | 112 | | 67 |
| Density (g/cm$^3$) | 0.952 | 0.948 | 0.951 | 0.949 | 0.951 | | 0.958 |
| Fisheye | none | none | none | none | none | | none |
| Stability of tubular product | good | good | good | good | good | | — |
| Extrusion molding rate (g) | 202 | 212 | 214 | 210 | 212 | | 330 |
| Film tear strength: MD (kg/cm) | 50 | 10.3 | 28 | 13.2 | 14.0 | | — |
| TD (kg/cm) | 255 | 104 | 185 | 125 | 93 | | — |
| ESCR (hr.) | >1000 | >1000 | >1000 | >1000 | >1000 | | 650 |
| Dart drop impact (g) | 1,480 | 720 | 1,070 | 720 | 590 | | — |

| Kind and amount of catalyst [mg] | Ref. 1 A 30 | Ref. 2 A 30 | Ref. 3 B 60 | Ref. 4 C 60 |
|---|---|---|---|---|
| Co-Catalyst | | | | |
| Kind | Al(Et)$_3$ | Al(Et)$_3$ | Al(i-Bu)$_3$ | Al(Et)$_3$ |
| Amount (m mol) | 0.5 | 0.5 | 1.0 | 1.0 |
| First step | | | | |
| Reaction temp. (°C.) | 90 | 80 | 90 | 90 |
| Molar ratio of H$_2$/C$_2$H$_4$ in vapor phase | 4.5 | 5.0 | 3.5 | 4.0 |
| α-Olefin | none | 1-C$_4$H$_8$ | none | none |
| Amount of α-olefin (wt. %) | none | 1.3 | none | none |
| Time (min.) | 95 | 82 | 100 | 100 |
| Amount of polyolefin B (wt. %) | 50 | 50 | 47 | 50 |
| MW of polyolefin B (× 10$^4$) | 1.4 | 1.2 | 1.5 | 1.4 |
| Second step | | | | |
| Reaction temp. (°C.) | 70 | 80 | 70 | 70 |
| Molar ratio of H$_2$/C$_2$H$_4$ in vapor phase | 0.06 | 0.07 | 0.05 | 0.04 |
| α-Olefin | 1-C$_4$H$_8$ | 1-C$_4$H$_8$ | 1-C$_4$H$_8$ | 1-C$_4$H$_8$ |
| Amount of α-olefin (wt. %) | 5.5 | 2.4 | 5.0 | 5.5 |
| Time (min.) | 75 | 50 | 95 | 70 |
| Amount of polyolefin A (wt. %) | 50 | 50 | 53 | 50 |
| MW of polyolefin A (× 10$^4$) | 39 | 36 | 36 | 40 |
| Properties of polymer | | | | |
| MI (g/10 min.) | 0.040 | 0.055 | 0.051 | 0.038 |
| FR | 65 | 70 | 59 | 68 |
| Density (g/cm$^3$) | 0.949 | 0.950 | 0.952 | 0.950 |
| Fisheye | formed | formed | formed | many |
| Stability of tubular product | bad | bad | bad | bad |
| Extrusion molding | 200 | 190 | 185 | 190 |

| | | | | |
|---|---|---|---|---|
| rate (g) | | | | |
| Film tear MD (kg/cm) | X | X | X | X |
| strength: TD (kg/cm) | X | X | X | X |
| ESCR (hr.) | — | — | — | — |
| Dart drop impact (g) | 750 | 630 | 580 | 760 |

Note:
X: unmeasurable
1-$C_4H_8$: 1-butene
1-$C_6H_{10}$: 1-hexene
1-$C_8H_{16}$: 1-octene
Al(Et)$_2$Cl: diethylaluminum chloride
Al(Et)$_3$: triethylaluminum
AlEtCl$_2$: ethylaluminum dichloride
Al(i-Bu)$_3$: triisobutylaluminum
Al$_2$Et$_3$Cl$_3$: ethylaluminum sesquichloride

EXAMPLES 14 TO 19

References 5 and 6

In a 5 liter autoclave, 3 liter of n-hexane and one of the catalytic components (A)–(E) shown in Table 2 in a predetermined amount was charged and each organo-aluminum compound shown in Table 2 in a predetermined amount was also charged. The autoclave was heated to each predetermined temperature and hydrogen was fed. Then, ethylene and the other α-olefin were fed and ethylene was continuously fed to perform a polymerization at a molecular ratio of $H_2/C_2H_4$ in vapor phase shown in Table 2. The amount of the polymer was calculated by the sum of the feed of ethylene.

When a desired yield was given, the feed of ethylene was stopped to finish the polymerization in the first step. The polymerization in the second step was started after charging hydrogen. Ethylene was continuously fed at a predetermined temperature shown in Table 2 at a molar ratio of $H_2/C_2H_4$ in vapor phase shown in Table 2 to perform the polymerization in the second step. The amount of the polymer was calculated as that of the first step.

The physical properties of the resulting polymers measured are shown in Table 2.

TABLE 2

| Kind and amount of catalyst [mg] | Exp. 14<br>A 30 | Exp. 15<br>A 30 | Exp. 16<br>B 60 | Exp. 17<br>C 60 | Exp. 18<br>D 80 | Exp. 19<br>E 100 | Ref. 5<br>A 30 | Ref. 6<br>C 60 |
|---|---|---|---|---|---|---|---|---|
| Co-Catalyst | | | | | | | | |
| Kind | Al(Et)$_2$Cl | Al(Et)$_2$Cl + Al(Et)$_3$ | Al(Et)$_2$Cl + Al(Et)$_3$ | Al(Et)$_2$Cl | Al(Et)$_2$Cl + Al(Et)$_3$ | Al$_2$(Et)$_3$Cl$_3$ + Al(Et)$_3$ | Al(Et)$_3$ | Al(i-Bu)$_3$ |
| Amount (m mol) | 0.5 | 0.4 + 0.1 (0.5) | 0.7 + 0.3 (1.0) | 1.0 | 1.0 + 0.4 (1.4) | 0.7 + 0.8 (1.5) | 0.5 | 1.0 |
| Cl/Al | 1.0 | 0.8 | 0.7 | 1.0 | 0.7 | 0.7 | | |
| First step | | | | | | | | |
| Reaction temp. (°C.) | 70 | 70 | 70 | 70 | 70 | 70 | 70 | 70 |
| Molar ratio of $H_2/C_2H_4$ in vapor phase | 0.20 | 0.13 | 0.10 | 0.07 | 0.07 | 0.15 | 0.04 | 0.03 |
| α-Olefin | 1-$C_4H_8$ | 1-$C_4H_8$ | 1-$C_4H_8$ | 1-$C_4H_8$ | 1-$C_4H_8$ | 1-$C_4H_8$ | 1-$C_4H_8$ | 1-$C_4H_8$ |
| Amount of α-olefin (wt. %) | 4.1 | 2.8 | 3.3 | 3.0 | 4.4 | 2.5 | 3.0 | 2.6 |
| Time (min.) | 70 | 40 | 35 | 40 | 50 | 60 | 55 | 45 |
| Amount of polyolefin A (wt. %) | 40 | 50 | 50 | 40 | 50 | 40 | 50 | 50 |
| MW of polyolefin A (× $10^4$) | 46 | 38 | 38 | 45 | 42 | 45 | 40 | 38 |
| Second step | | | | | | | | |
| Reaction temp. (°C.) | 80 | 80 | 80 | 80 | 80 | 80 | 80 | 80 |
| Molar ratio of $H_2/C_2H_4$ in vapor phase | 7.5 | 6.0 | 6.0 | 6.5 | 9.0 | 10.0 | 4.5 | 4.0 |
| Time (min.) | 240 | 120 | 100 | 120 | 150 | 150 | 150 | 140 |
| Amount of polyolefin B (wt. %) | 60 | 50 | 50 | 60 | 50 | 60 | 50 | 50 |
| MW of polyolefin B (× $10^4$) | 1.3 | 1.6 | 1.3 | 1.4 | 1.4 | 1.2 | 1.4 | 1.2 |
| Properties of polymer | | | | | | | | |
| MI (g/10 min.) | 0.053 | 0.038 | 0.044 | 0.048 | 0.030 | 0.055 | 0.036 | 0.045 |
| FR | 103 | 87 | 64 | 93 | 85 | 108 | 73 | 70 |
| Density (g/cm$^3$) | 0.948 | 0.953 | 0.952 | 0.950 | 0.949 | 0.950 | 0.950 | 0.949 |
| Fisheye | none | none | none | none | none | none | formed | formed |
| Stability of tubular product | good | good | good | good | good | good | bad | bad |
| Extrusion molding rate (g) | 210 | 207 | 205 | 207 | 203 | 210 | 185 | 188 |
| Film tear MD (kg/cm) | 11.0 | 13.5 | 38 | 10.8 | 12.5 | 10.5 | X | X |
| strength: TD (kg/cm) | 120 | 110 | 240 | 132 | 124 | 103 | X | X |
| ESCR (hr.) | >1000 | — | — | >1000 | — | — | — | — |
| Dart drop impact (g) | 680 | 820 | 1,150 | 650 | 780 | 580 | — | — |

EXAMPLE 20

Two reactors having each capacity of 0.6 m$^3$ were used and a continuous polymerization was carried out.

In the first reactor, n-hexane was fed at a rate of 67 kg/hr. and a mixture of triethylaluminum and diethylaluminum chloride at a molar ratio of 1:9 was fed at a rate of 4 g./hr. and the solid catalytic component (A) was fed at a rate of 2.0 g./hr. and ethylene was fed at a rate of 24.0 kg./hr. by continuous feeding under maintaining a molar ratio of $H_2/C_2H_4$ in vapor phase at 90° C. under a total pressure of 17 kG. to perform the polymerization.

The slurry of the polymer produced in the first reactor was continuously fed into the second reactor wherein n-hexane was fed at a rate of 82 kg./hr. and ethylene was fed at a rate of 26.8 kg./hr. and 1-butene was fed at a rate of 3.0 kg./hr. by continuous feeding under maintaining a molar ratio of $H_2/C_2H_4$ in vapor phase of 0.17 and a molar ratio of $C_4H_8/C_2H_4$ in vapor phase of 0.055 at 70° C. under a total pressure of 3 kG. to perform the polymerization. The slurry of the polymer was continuously discharged from the second reactor and the polymer was dried. The yield of the polymer was 50 kg./hr. The polymers produced in the first reactor and in the second reactor had respectively viscosity average molecular weight of 13,000 and 370,000 and a ratio of the polymer was 50:50.

The physical properties of the polymer were measured. The results are as follows:

MI=0.040; FR=90; Density=0.949; No fisheye: Extrusion rate=210 g./min. Stable bubble.

Tear strength of film (with notch)=11.3 kg./cm in longitudinal direction, 149 kg./cm in transversal direction.

Dart Drop Impact strength=780 g.

The texture of the film was fine.

We claim:

1. A process for producing a polyolefin which comprises polymerizing ethylene or copolymerizing ethylene and another α-olefin at 50° to 100° C. in a hydrocarbon solvent in the presence of a catalyst system comprising:
   (1) an organoaluminum compound selected from the group consisting of an alkylaluminum chloride and a mixture of an alkylaluminum chloride and a trialkyl aluminum,
   (2) a transition metal compound component which is a solid component containing a reaction product obtained by reacting an oxygen-containing organomagnesium compound represented by the formula:

$$Mg(OR^1)_m X^1_{2-m}$$

wherein
R$^1$ represents alkyl, aryl, or cycloalkyl,
X$^1$ represents halogen, and
m is 1 or 2
and tri-n-butoxytitanium monochloride with ethylaluminum sesquichloride;
wherein said process of polymerization comprises:
   (a) two-step polymerization of a first polymerization step and a second polymerization step in the presence of a reaction mixture obtained by said first polymerization step;
   (b) a polymerization in the presence of hydrogen at a molar ratio of $H_2$ to $C_2H_4$ (vapor phase) of 0.01–0.8 to produce a polymer A having a viscosity average molecular weight of $2\times10^5$–$7\times10^5$ at a ratio of 30:70 weight percent based on the total polymer in one of said first or second polymerization step and a polymerization in the presence of hydrogen at a molar ratio of $H_2$ to $C_2H_4$ (vapor phase) of 1.5–15 to produce a polymer B having a viscosity average molecular weight of $1\times10^4$–$4\times10^4$ at a ratio of 70:30 weight percent based on the total polymer in the other polymerization step to give a ratio of viscosity average molecular weight of polymer A to a viscosity average molecular weight of polymer B of 15:55;
   (c) said production of said polymer A as a copolymer of ethylene and other -olefin and said production of said polymer B as a homopolymer of ethylene or a copolymer of ethylene and the other -olefin; and
   (d) said production of the total polymer as a polymer having a melt index of less than 0.5 g/10 min.

2. The process of claim 1, wherein said reaction product is obtained by adding ethylaluminum sesquichloride to an inert hydrocarbon solution containing said oxygen-containing organomagnesium compound and tri-n-butoxytitanium monochloride and allowing the components of the mixture to react.

* * * * *